United States Patent
Sung et al.

(10) Patent No.: US 9,569,011 B2
(45) Date of Patent: Feb. 14, 2017

(54) OPTICAL SENSOR MODULE UTILIZING OPTICAL DESIGNS TO ADJUST GESTURE SENSITIVE REGION, AND RELATED MOBILE APPARATUS

(71) Applicant: EMINENT ELECTRONIC TECHNOLOGY CORP. LTD., Hsinchu (TW)

(72) Inventors: Hsin-Yueh Sung, New Taipei (TW); Tom Chang, Taipei (TW); Kao-Pin Wu, New Taipei (TW); Cheng-Ta Chuang, New Taipei (TW); Wei-Te Hsu, New Taipei (TW)

(73) Assignee: EMINENT ELECTRONIC TECHNOLOGY CORP. LTD., Hsinchu (TW)

( * ) Notice: Subject to any disclaimer, the term of this patent is extended or adjusted under 35 U.S.C. 154(b) by 84 days.

(21) Appl. No.: 14/705,995

(22) Filed: May 7, 2015

(65) Prior Publication Data
US 2015/0324063 A1    Nov. 12, 2015

Related U.S. Application Data

(60) Provisional application No. 61/990,718, filed on May 9, 2014.

(30) Foreign Application Priority Data

Apr. 8, 2015 (TW) .............................. 104111320 A

(51) Int. Cl.
*G01B 11/24*    (2006.01)
*G06F 3/03*    (2006.01)
(Continued)

(52) U.S. Cl.
CPC ............. *G06F 3/0304* (2013.01); *G06F 3/011* (2013.01); *G06F 3/017* (2013.01); *G06F 3/0425* (2013.01)

(58) Field of Classification Search
CPC ..... G01B 11/026; G01B 11/002; G01B 11/14; G01S 5/163; G01S 5/16
See application file for complete search history.

(56) References Cited

U.S. PATENT DOCUMENTS 6,559,981 B1 * 5/2003 Aoki ................... H04N 5/3653
                                                    348/E3.027
7,286,450 B2 * 10/2007 Miyake ................ G11B 7/1372
                                                    369/44.32

(Continued)

FOREIGN PATENT DOCUMENTS

| JP | 200854030 | 3/2008 |
| TW | M371274 U1 | 12/2009 |
| TW | 201342584 A | 10/2013 |

*Primary Examiner* — Tarifur Chowdhury
*Assistant Examiner* — Md M Rahman
(74) *Attorney, Agent, or Firm* — Winston Hsu; Scott Margo

(57) ABSTRACT

An optical sensor module is provided. The optical sensor module includes a light source, a first lens and a sensor device. The light source is arranged for generating a light signal. The first lens has a first optical center axis. The sensor device is disposed in correspondence with one side of the first lens. The sensor device includes a light sensitive area, and a center of the light sensitive area deviates from the first optical center axis. The sensor device is arranged for receiving a reflected signal reflected from an object in response to the light signal, and accordingly generating a sensing result.

6 Claims, 18 Drawing Sheets

(51) Int. Cl.
G06F 3/042 (2006.01)
G06F 3/01 (2006.01)

(56) References Cited

U.S. PATENT DOCUMENTS

2004/0140984 A1* 7/2004 Hinckley ............ G06F 3/03547
 345/684
2009/0278033 A1 11/2009 Lin
2011/0291988 A1* 12/2011 Bamji ................... G06F 3/0428
 345/175

* cited by examiner

OPTICAL SENSOR MODULE UTILIZING OPTICAL DESIGNS TO ADJUST GESTURE SENSITIVE REGION, AND RELATED MOBILE APPARATUS

CROSS REFERENCE TO RELATED APPLICATIONS

This application claims the benefit of U.S. provisional application No. 61/990,718, filed on May 9, 2014, the contents of which are incorporated herein by reference.

BACKGROUND OF THE INVENTION

1. Field of the Invention

The disclosed embodiments of the present invention relate to an optical sensor, and more particularly, to an optical sensor module utilizing optical designs to change a non-contact gesture sensitive region, and a related mobile apparatus.

2. Description of the Prior Art

As an optical sensor module recognizes a motion of a reflecting object (e.g. a user's hand) by detecting reflected light reflected from the reflecting object, the optical sensor module can be disposed in a mobile apparatus (e.g. a smart phone) to realize a non-contact operation. The optical sensor module is disposed outside of a display screen to avoid overlapping disposition. For example, regarding a mobile apparatus 100 shown in FIG. 1, an optical sensor module 102 is disposed on the outer periphery of a display screen 104. As a sensing region (a gesture sensitive region $R_N$) is located directly above the optical sensor module 102, the user has to perform a non-contact (or touchless) gesture directly above a frame of the mobile apparatus 100 in order to ensure that the optical sensor module 102 can detect a reflected signal reflected from the user's hand.

However, when the user performs the non-contact gesture (e.g. the hand moves rightward or leftward), the user's elbow blocks the user's view of the display screen 104, which causes inconvenience to the user. Further, when operating the mobile phone 100 for the first time, the user performs a non-contact gesture intuitively above a center of a display area $D_N$ rather than the optical sensor module 102. In other words, the user has to learn where a non-contact gesture sensitive region is when operating the mobile phone 100 for the first time.

Thus, there is a need for a novel optical sensor design which can provide user-friendly experience.

SUMMARY OF THE INVENTION

It is therefore one objective of the present invention to provide an optical sensor module utilizing optical designs to change a non-contact gesture sensitive region, and a related mobile apparatus to solve the above problems.

According to an embodiment of the present invention, an exemplary optical sensor module is disclosed. The exemplary optical sensor module comprises a light source, a first lens and a sensor device. The light source is arranged for generating a light signal. The first lens has a first optical center axis. The sensor device is disposed in correspondence with one side of the first lens. The sensor device comprises a light sensitive area, and a center of the light sensitive area deviates from the first optical center axis. The sensor device is arranged for receiving a reflected signal reflected from an object in response to the light signal, and accordingly generating a sensing result.

According to another embodiment of the present invention, an exemplary mobile apparatus is disclosed. The exemplary mobile apparatus comprises a display screen and an optical sensor module. The display screen has a display area. The optical sensor module is disposed outside the display area. The optical sensor module comprises a light source, a first lens and a sensor device. The light source is arranged for generating a light signal. The first lens has a first optical center axis. The sensor device is disposed in correspondence with one side of the first lens. The sensor device comprises a light sensitive area, and a center of the light sensitive area deviates from the first optical center axis. The sensor device is arranged for receiving a reflected signal reflected from an object in response to the light signal, and accordingly generating a sensing result. Projection of a sensing region of the optical sensor module on the display area comprises a center of the display area.

According to another embodiment of the present invention, an exemplary optical sensor module is disclosed. The exemplary optical sensor module comprises a plurality of first lenses, a plurality of light sources, a second lens and a sensor device. Each of the first lenses has a first optical center axis. The light sources are disposed in correspondence with the first lenses respectively, and are arranged for generating a plurality of light signals respectively. Regarding each light source, the light source is disposed in correspondence with one side of a corresponding first lens, a center of a light emitting area of the light source deviates from a corresponding first optical center axis, and a light signal generated by the light source travels through the corresponding first lens toward an object. The second lens has a second optical center axis. The sensor device is disposed in correspondence with one side of the second lens. The sensor device comprises a light sensitive area, and a center of the light sensitive area deviates from the second optical center axis. A plurality of reflected signals are reflected from the object in response to the light signals respectively, and travel through the second lens toward the sensor device. The sensor device is arranged for receiving the reflected signals, and accordingly generating a sensing result. The center of the light emitting area of the light source deviates from the corresponding first optical center axis in a first direction, the center of the light sensitive area deviates from the second optical center axis in a second direction, and an angle between the first direction and the second direction is smaller than 90 degrees.

The proposed optical sensor module may be employed in various electronic products (e.g. a portable apparatus such as a mobile phone or a tablet computer), and utilize optical path designs to adjust a non-contact gesture sensitive region, thus allowing intuitive and convenient control.

These and other objectives of the present invention will no doubt become obvious to those of ordinary skill in the art after reading the following detailed description of the preferred embodiment that is illustrated in the various figures and drawings.

DETAILED DESCRIPTION

By means of optical path designs (e.g. changing a light receiving range of a sensor in space, and/or changing an illumination range of a light source in space), the proposed light sensing architecture may realize a non-contact gesture sensitive region (or a non-contact working range) which meets user's habits. To facilitating an understanding of the present invention, an exemplary implementation of an electronic apparatus (or an optical sensor module), which recognizes a non-contact gesture according to a phase difference between reflected signals, is given in the following for further description of the proposed light sensing architecture. However, the proposed light sensing architecture may be employed in an electronic apparatus (or an optical sensor module) which utilizes other detection mechanisms (e.g. detecting an object image or calculating an object position) to recognize a non-contact gesture.

Figure 1:
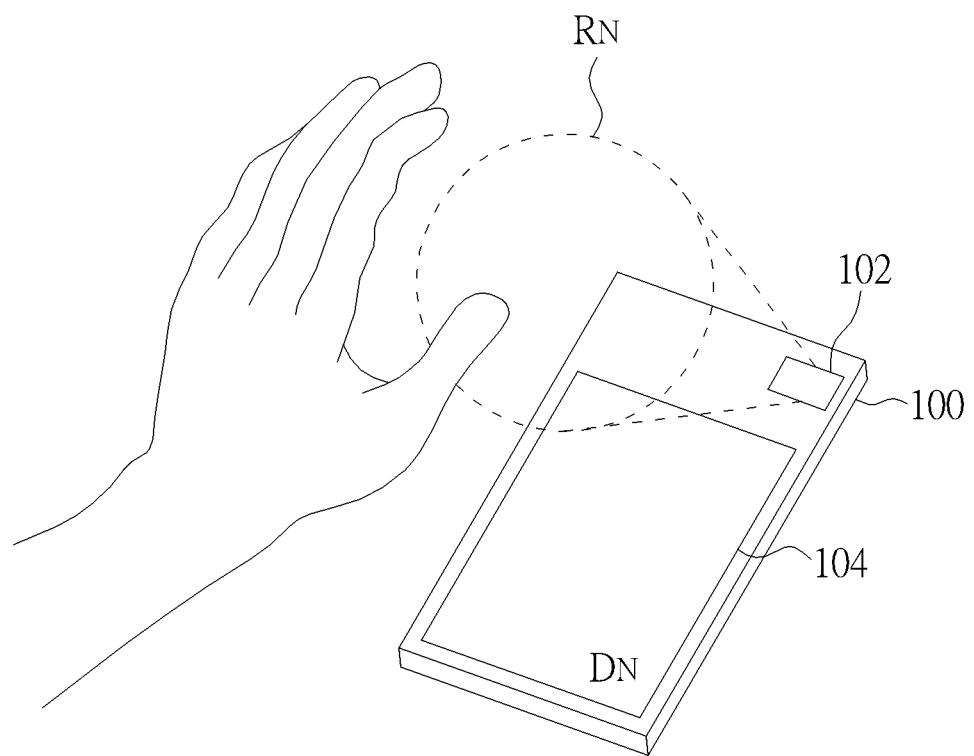
FIG. 1 is a diagram illustrating a conventional mobile apparatus.
Figure 2:
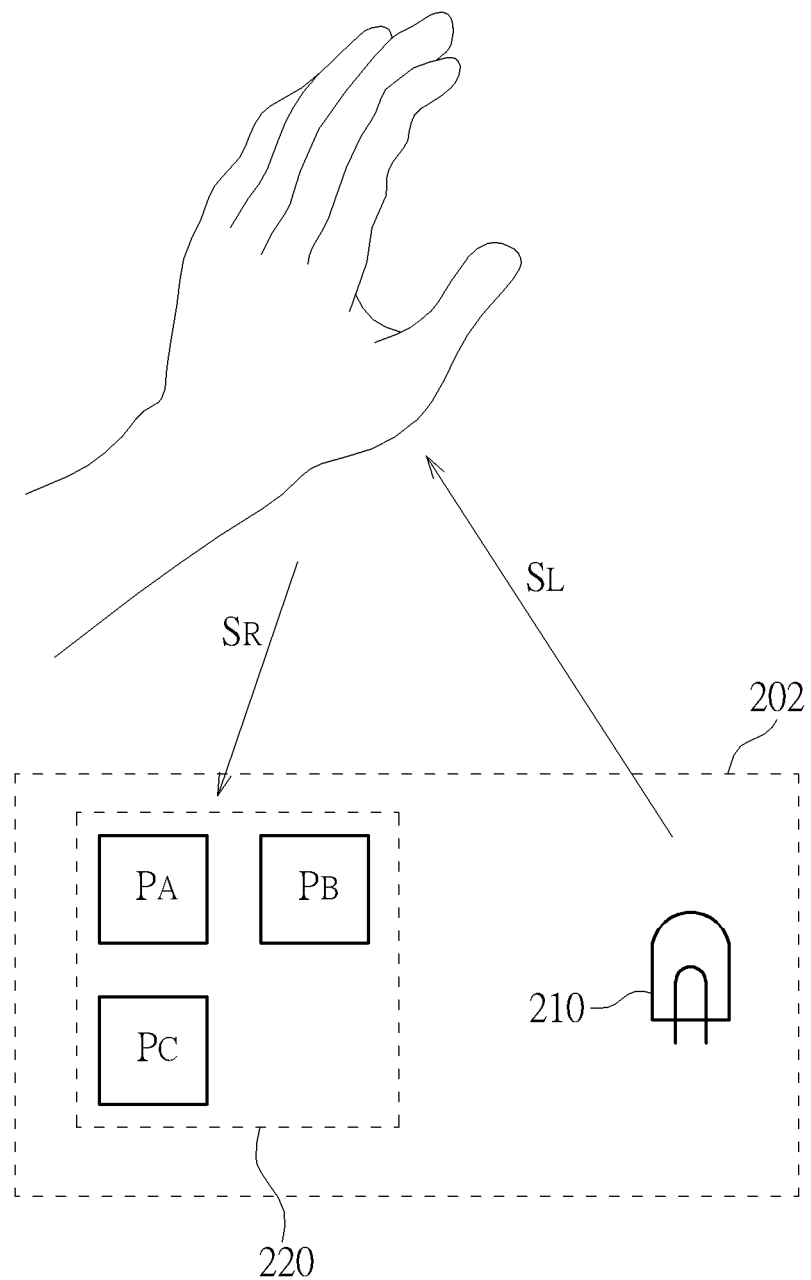
FIG. 2 is a diagram illustrating an exemplary optical sensor module according to an embodiment of the present invention.

FIG. 2 is a diagram illustrating an exemplary optical sensor module according to an embodiment of the present invention. In this embodiment, the optical sensor module 202 may include a light source 210 (e.g. an infrared light emitting diode (LED), a laser diode or an ultraviolet LED) and a sensor device 210 (i.e. an optical sensor), wherein the sensor device 220 may include a plurality of sensing pixels $P_A$-$P_C$. When the light source 210 emits a light signal $S_L$, the sensor device 220 may receive a reflected signal $S_R$ reflected from an object (i.e. the user's hand) in response to the light signal $S_L$, and accordingly generate a sensing result. For example, in a period of time during which the user's hand moves from left to right, as the user's hand keeps moving, reflected signals respectively received by the sensing pixels $P_A$-$P_C$ (located at different positions) may have different signal waveforms, resulting in phase differences. The sensor device 220 may generate the sensing result accordingly, and the optical sensor module 202 may recognize the user's gesture according to the sensing result.

Figure 3:
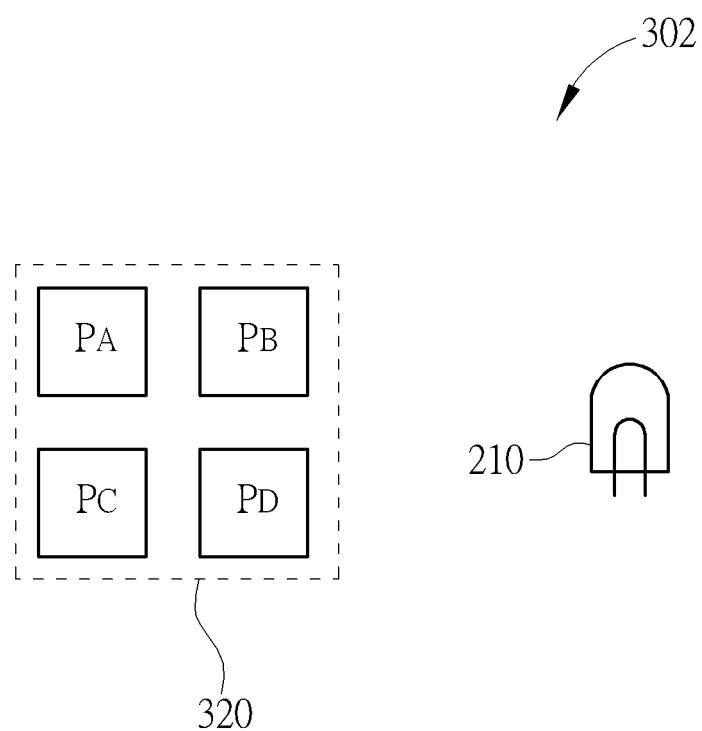
FIG. 3 is a diagram illustrating an exemplary optical sensor module according to another embodiment of the present invention.

Although the sensor device 220 shown in FIG. 2 includes three sensing pixels $P_A$-$P_C$, this is not meant to be a limitation of the present invention. In an alternative design, the sensor device 220 may include only one sensing pixel to detect an approaching gesture and a receding gesture. In another alternative design, the sensor device 220 may include only two sensing pixels to detect a wave gesture (a horizontal movement or a vertical movement). In yet another alternative design, the number of sensing pixels included in the sensor device 220 may be greater than three. For example, in the embodiment shown in FIG. 3, a sensor device 320 of an optical sensor module 302 may include four sensing pixels $P_A$-$P_D$.

In addition, the sensing pixels $P_A$-$P_D$ may be implemented by a sensor array. Please refer to FIG. 4, which is an exemplary optical sensor module according to another embodiment of the present invention. The architecture of the optical sensor module 402 is based on that of the optical sensor module 202 shown in FIG. 2 (or the optical sensor module 302 shown in FIG. 3), wherein the main difference is that a sensor device 420 may include a sensor array 422. In this embodiment, the sensor array 422 may be implemented by a proximity sensor array having a plurality of sensing pixels (each sensing pixel is labeled "P") arranged in M rows and N columns, wherein M and N are positive integers. It should be noted that, in a case where the proposed sensor device includes at least three sensing pixels, the proposed optical sensor module may recognize every non-contact gesture (e.g. a wave gesture, an approaching gesture, a receding gesture or a rotation gesture) in space. Further, in a case where the proposed sensor device includes a sensor array, the proposed optical sensor module may further utilize image processing to calculate object positions and related movement.

In a case where an optical sensor module capable of recognizing non-contact gestures is disposed in an electronic apparatus, a mobile apparatus capable of non-contact control may be realized. Please refer to FIG. 5, which is an exemplary mobile apparatus according to an embodiment of the present invention. The mobile apparatus 500 may include, but is not limited to, an optical sensor module 502 and a display screen 504, wherein the display screen 504 has a display area $D_T$. It should be noted that, even though the optical sensor module 502 is disposed outside the display area $D_T$ (e.g. on a frame of the mobile apparatus 500), projection of a sensing region (a gesture sensitive region $R_T$) of the optical sensor module 502 on the display area $D_T$ may include a center of the display area $D_T$ with the aid of internal design of the optical sensor module 502. Further description is provided below.

Figure 5:
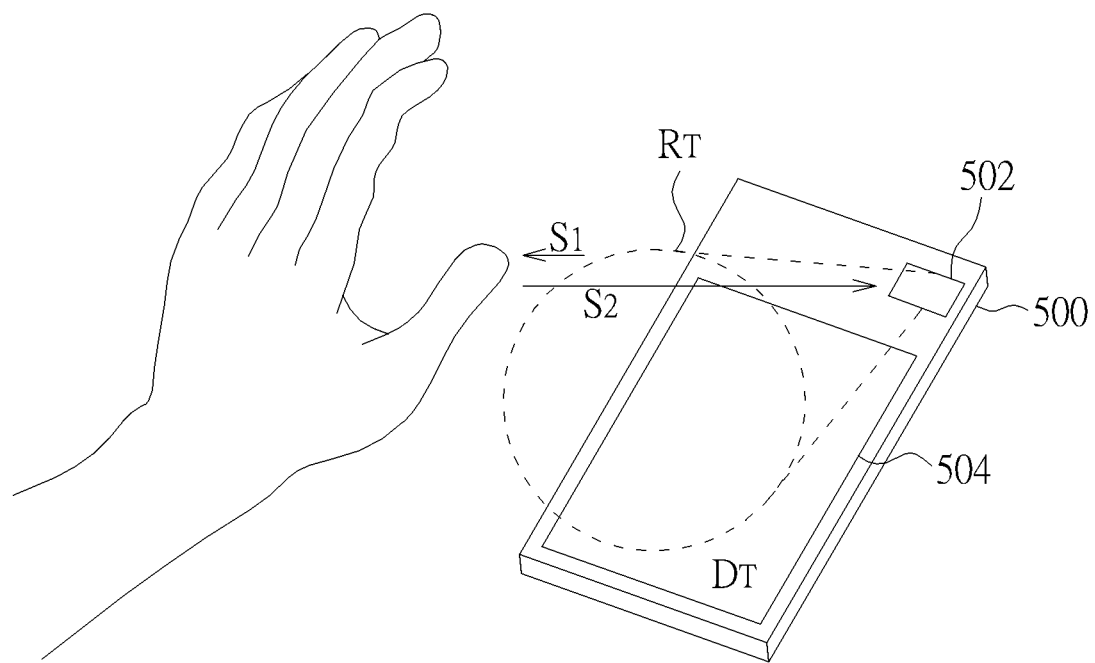
FIG. 5 is an exemplary mobile apparatus according to an embodiment of the present invention.
Figure 6:
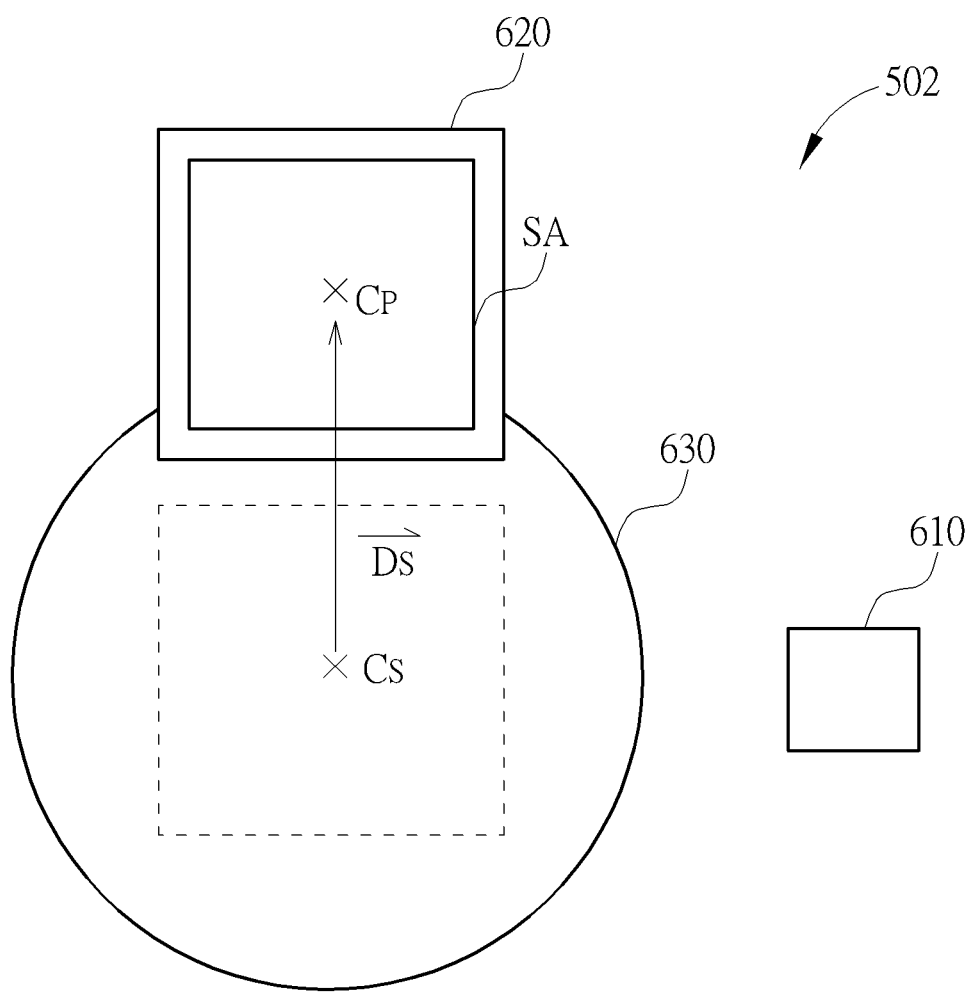
FIG. 6 is a top view of an implementation of the optical sensor module shown in FIG. 5.
Figure 7:
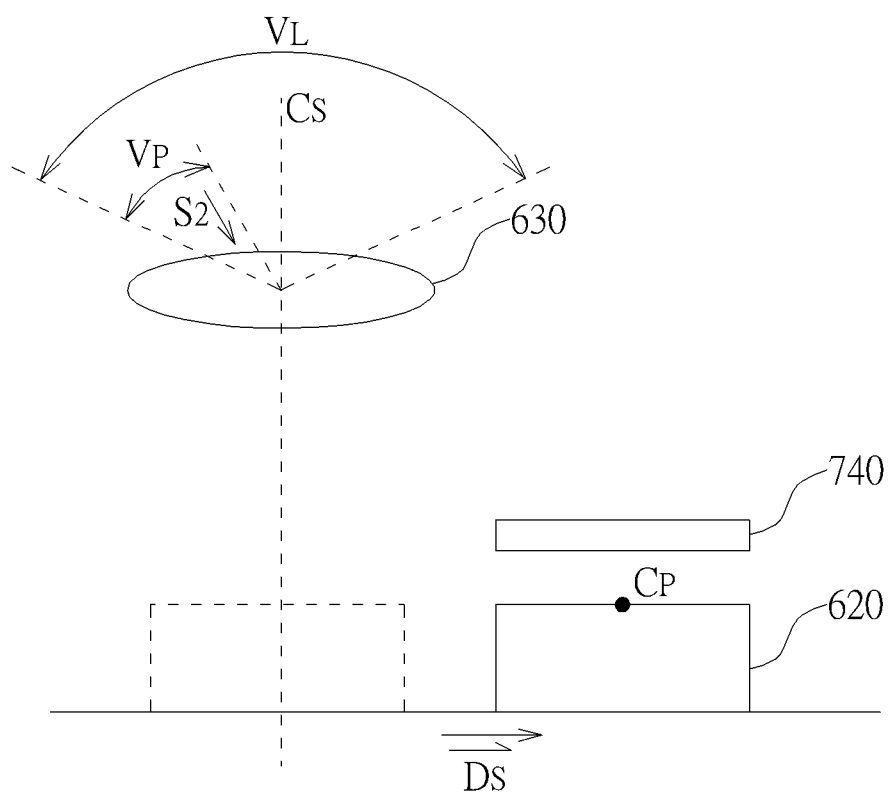
FIG. 7 is a side view of a sensor device shown in FIG. 6.

Please refer to FIGS. 5-7. FIG. 6 is a top view of an implementation of the optical sensor module 502, and FIG. 7 is a side view of a sensor device 620 shown in FIG. 6. In this implementation, the optical sensor module 502 may include a light source 610, a lens 630 and the sensor device 620, wherein the lens 630 has an optical center axis $C_S$. The sensor device 620 is disposed in correspondence with one side of the lens 630, and may include a light sensitive area SA, wherein a center $C_P$ of the light sensitive area SA deviates from the optical center axis $C_S$ in a direction $D_S$. The light source 610 may generate a light signal $S_1$. The sensor device 620 may receive a reflected signal $S_2$ reflected from an object (e.g. a user's hand) in response to the light signal $S_1$, and accordingly generate a sensing result for gesture recognition. Please note that, in order to facilitate an understanding of deviation between the sensor device 620 and the optical center axis $C_S$, dashed line rectangles shown in FIG. 6 and FIG. 7 represent disposition locations of a conventional sensor device. In other words, a center of a light sensitive area of the conventional sensor device is disposed in correspondence with the optical center axis $C_S$ of the lens 630 such that the optical center axis $C_S$ passes through (or very close to) the center of the light sensitive area. Additionally, although the sensor device 620 shown in FIG. 7 is disposed on a plane and deviates from the optical center axis $C_S$, this is not meant to be a limitation of the present invention. For example, the sensor device 620 may be disposed on a non-planar surface (e.g. a curved surface). As long as disposition of a center of a light sensitive area of an optical sensor deviates from an optical center axis of a corresponding lens, such variations and modifications fall within the spirit and scope of the present invention.

Figure 4:
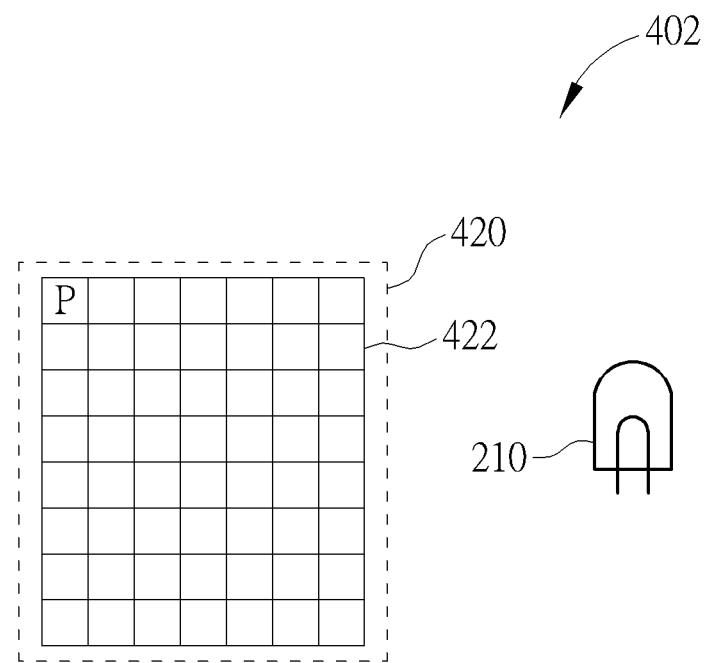
FIG. 4 is an exemplary optical sensor module according to another embodiment of the present invention.
Figure 8:
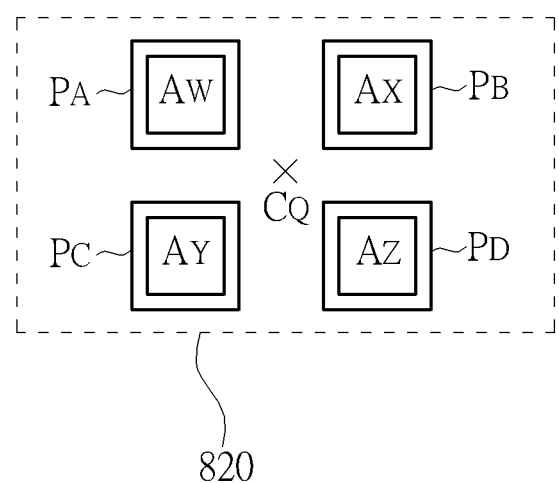
FIG. 8 is a diagram illustrating a center of a light sensitive area of an exemplary sensor device according to an embodiment of the present invention.

In this implementation, the sensor device 620 may include a sensor array (e.g. the sensor array 422 shown in FIG. 4). Hence, a central pixel of the sensor array may be regarded as the center $C_P$ of the light sensitive area SA. Further, in a case where the sensor device 620 includes a plurality of sensing pixels disposed separately from each other, a center of respective light sensitive areas of the sensing pixels may be regarded as the center $C_P$ of the light sensitive area SA. For example, a sensor device 820 shown in FIG. 8 includes a plurality of sensing pixels $P_W$-$P_Z$, which have a plurality of light sensitive areas $A_W$-$A_Z$ respectively. Hence, a geometric center $C_O$ of the light sensitive areas $A_W$-$A_Z$ may be regarded as a center of a light sensitive area of the sensor device 820.

As shown in FIG. 7, the reflected signal $S_2$ first falls on the lens 630 and then travels toward the sensor device 620. Hence, in a case where the disposition of sensor device 620 deviates from the optical center axis $C_S$, the sensor device 620 may receive/detect reflected light incident on the lens 630 at a large angle. In other words, reflected light received by the sensor device 620 is not limited to light incident from directly above the lens 630 onto the lens 630. Specifically, as the center $C_P$ of the light sensitive area SA deviates from the optical center axis $C_S$, the reflected signal $S_2$ may fall on the lens 630 from only a portion of a field of view (FOV) $V_L$ (i.e. an FOV $V_P$) of the lens 630 (e.g. ranging from 10 degrees to 45 degrees), and then be received by the sensor device 620. In view of the above, by means of the deviation between the sensor device 620 and the optical center axis $C_S$, the optical sensor module 502 may realize off-axis viewing/sensing. Thus, the sensing region of the optical sensor module 502 is not limited to a region directly thereabove.

The proposed optical sensor module may further include a microlens structure to improve sensitivity performance. For example, in the embodiment shown in FIG. 7, the optical sensor module 502 may further include a microlens structure 740, which is disposed between the lens 630 and the sensor device 620. The microlens structure 740 may be arranged for changing a path along which the reflected signal $S_2$ travels from the lens 630 toward the sensor device 620. In one implementation, reflected light, which is incident from the lens 630 to the sensor device 620, may be converged by the microlens structure 740 first and then fall on the sensor device 620. Sensitivity performance of the optical sensor module 502 may be enhanced accordingly.

Figure 9:
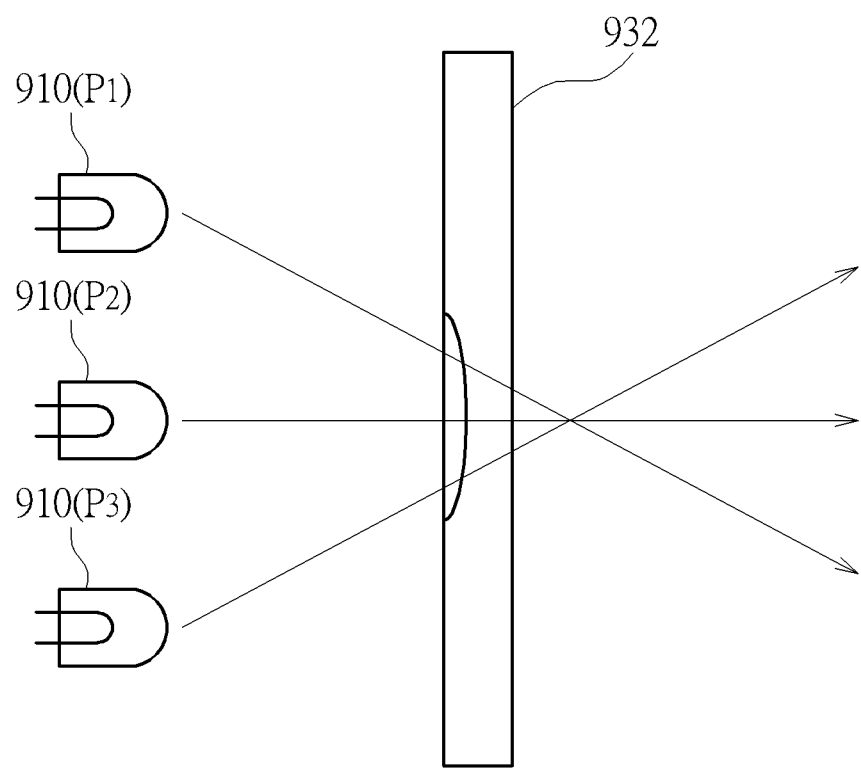
FIG. 9 is a diagram illustrating different optical paths of light signals associated with different positions of light sources according to an embodiment of the present invention.

As a gesture sensitive region of an optical sensor module is an intersection of an illumination range of a light source and a sensing range of a sensor device, the proposed optical sensor module may, in addition to changing relative disposition between a sensor device and a lens to adjust an FOV of the sensor device, adjust disposition of a light source to emit a light signal to a region above a center of a display screen (or a display area), thereby allowing the user to perform a gesture above the center of the display screen (or the display area). For example, the projection of the gesture sensitive region $R_T$ shown in FIG. 5 on the display area $D_T$ may include the center of the display area $D_T$. FIG. 9 is a diagram illustrating different optical paths of light signals associated with different positions of light sources according to an embodiment of the present invention. As shown in FIG. 9, light signals emitted by a light source 910 at different positions $P_1$-$P_3$ have different optical paths (travels at different angles) after passing through a lens 932. Hence, even if a disposition of a sensor device of an optical sensor module does not deviate from an optical center axis, a gesture sensitive region may be adjusted according to adjustment of disposition of a light source, thus allowing the user to perform a gesture above a center of a display screen.

Figure 10:
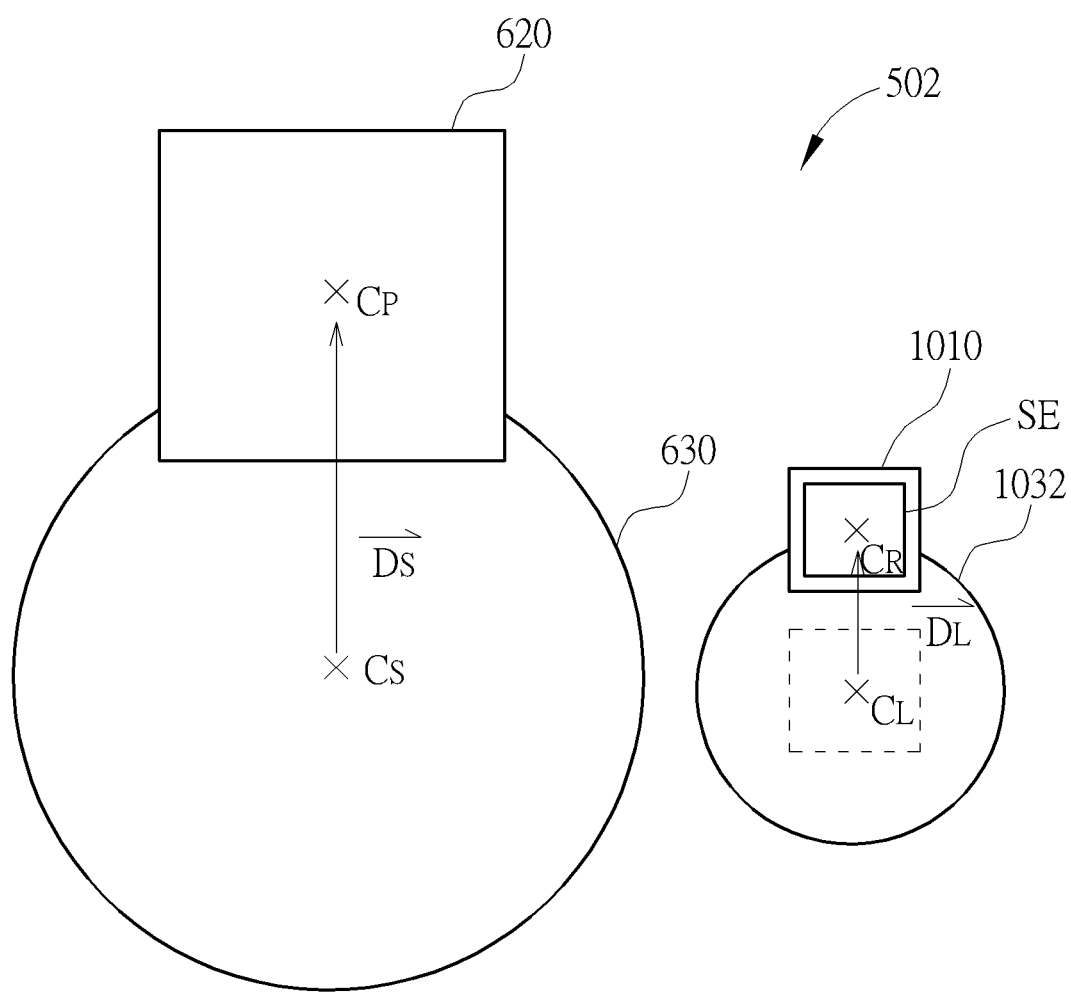
FIG. 10 is a top view of another implementation of the optical sensor module shown in FIG. 5.

Respective positions of a light source and a sensor device of the proposed optical sensor module may deviate from respective optical center axes. Please refer to FIG. 10 in conjunction with FIG. 5. FIG. 10 is a top view of another implementation of the optical sensor module 502. In this implementation, an optical sensor module 1002 may include the sensor device 620 and the lens 630 shown in FIG. 6, a light source 1010 and a lens 1032. The light source 1010 is disposed in correspondence with one side of the lens 1032, wherein the light signal $S_1$ generated by the light source 1010 may travel through the lens 1032 toward an object (e.g. the user's hand), and the sensor device 620 may receive the reflected signal $S_2$ reflected from the object in response to the light signal $S_1$. The lens 1032 has an optical center axis $C_L$, and a center $C_R$ of a light emitting area SE of the light source 1010 deviates from the optical center axis $C_L$ in a direction $D_L$. In contrast to a conventional light source which is disposed in correspondence with the optical center axis $C_L$ (a dashed line rectangle illustrated in FIG. 10 represents a disposition location of the conventional light source), the light signal $S_1$ emitted by the light source 1010 travels at a larger angle with respect to the optical center axis $C_L$ after passing through the lens 1032. As the sensor device 620 may receive reflected light incident on the lens 630 at a larger angle, a gesture sensitive region of the optical sensor module 1002 is not limited to a region directly thereabove. The gesture sensitive region of the optical sensor module 1002 may further extend to a region above a center of the display screen 504. For example, an angle between the direction $D_S$ and the direction $D_L$ may be smaller than 90 degrees. This means that a component of the direction $D_S$ (in which the light source 1010 deviates; in contrast to a conventional light source) in the direction $D_L$ (in which the sensor device 620 deviates; in contrast to a conventional sensor device) has the same sign as the direction $D_L$. Hence, light emitted by the light source 1010 may travel toward the FOV of the sensor device 620, thus increasing sensitivity performance of the optical sensor module 1002.

Figure 11:
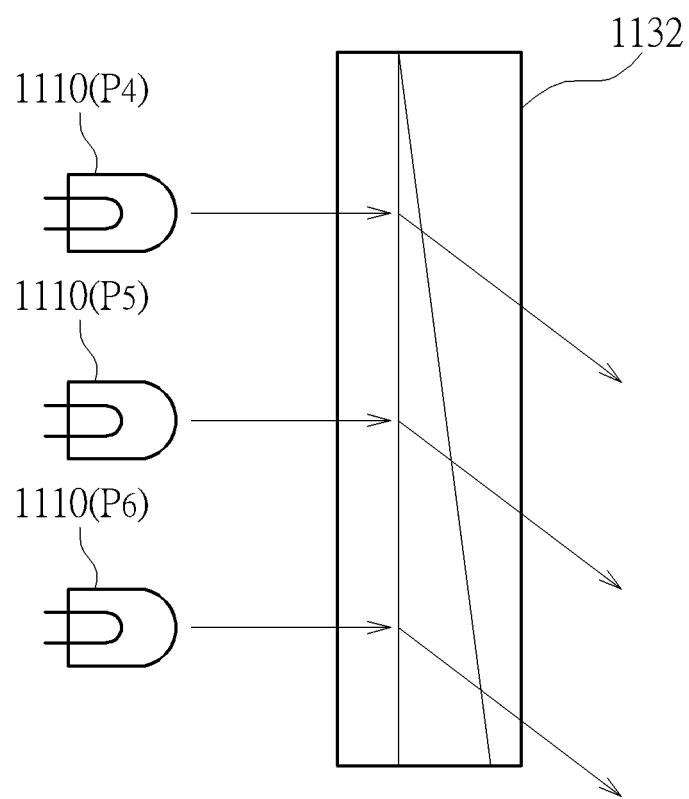
FIG. 11 is a diagram illustrating optical paths adjusted by an optical lens according to an embodiment of the present invention.

In addition to adjusting a disposition location of a light source, it is possible to employ other optical designs to change an optical path of a light signal generated by the light source. Please refer to FIG. 11, which is a diagram illustrating optical paths adjusted by an optical lens according to an embodiment of the present invention. As shown in FIG. 11, after passing through a prism 1132, light signals emitted from a light source 1110 at different positions $P_4$-$P_6$ may have optical paths parallel to each other. In other words, the light source 1110 at the different positions $P_4$-$P_6$ may correspond to different optical center axes. Hence, an optical path of a light signal generated from a light source may be changed due to disposition of an optical lens (e.g. a prism), and a gesture sensitive region may be adjusted accordingly. For example, the lens 1032 shown in FIG. 10 may be replaced with the prism 1132 shown in FIG. 11. In another example, the prism 1132 may be disposed in correspondence with another side of the lens 1032 shown in FIG. 10 (i.e. the lens 1032 is disposed between the light source 1010 and the prism 1132) so as to adjust a gesture sensitive region. It should be noted that, as long as an illumination range of a light source may be changed, it is possible to utilize another optical lens different a prism.

Figure 12:
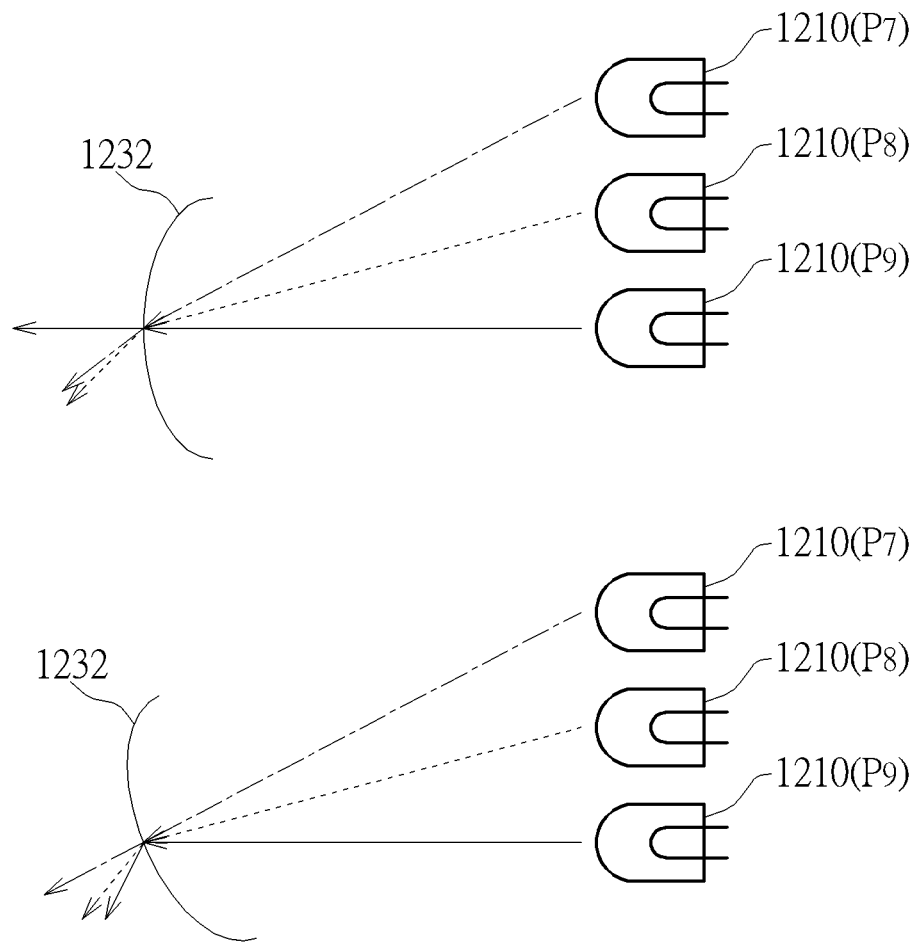
FIG. 12 is a diagram illustrating optical paths adjusted by a tilted lens corresponding to a light source according to an embodiment of the present invention.

Please refer to FIG. 12, which is a diagram illustrating optical paths adjusted by a tilted lens corresponding to a light source according to an embodiment of the present invention. The upper portion of FIG. 12 illustrates optical paths of light signals which are emitted from a light source 1210 at different positions $P_7$-$P_9$ and travel through a lens 1232. In contrast, as illustrated in the lower portion of FIG. 12, the lens 1232 may be tilted at a specific angle to change optical paths of light signals which are emitted from the light source 1210 and travel through the lens 1232. Hence, a gesture sensitive region may be adjusted.

Figure 13:
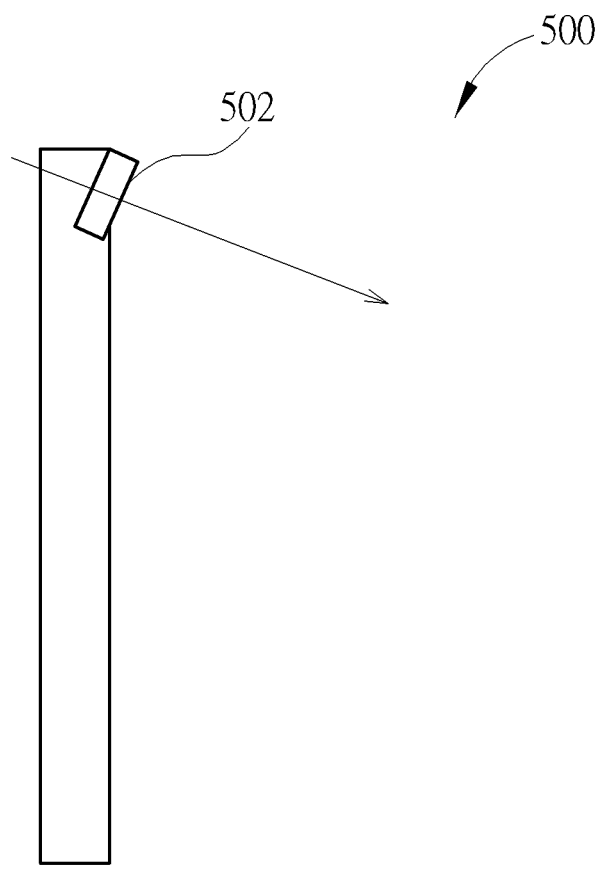
FIG. 13 is a side view of an implementation of the mobile apparatus shown in FIG. 5.

It should be noted that one or more than one optical design described above may be used to adjust a location/range of a gesture sensitive region. For example, only optical designs involved with a light emitting side (light source(s) and corresponding lens(es)) are utilized to adjust a location/range of a gesture sensitive region. In another example, only optical designs involved with a sensor side (sensor device(s) and corresponding lens(es)) are utilized to adjust a location/range of a gesture sensitive region. In yet another example, the optical designs involved with the light emitting side and the optical designs involved with the sensor side are used for adjusting a location/range of a gesture sensitive region. In addition, the concept of the optical designs involved with the light emitting side may be applied to the sensor side or the whole optical sensor module. For example, the whole optical sensor module 502 shown in FIG. 5 may be tilted at a specific angle (as shown in FIG. 13, which is a side view of an implementation of the mobile apparatus 500) so as to adjust a location/range of a gesture sensitive region.

Figure 14:
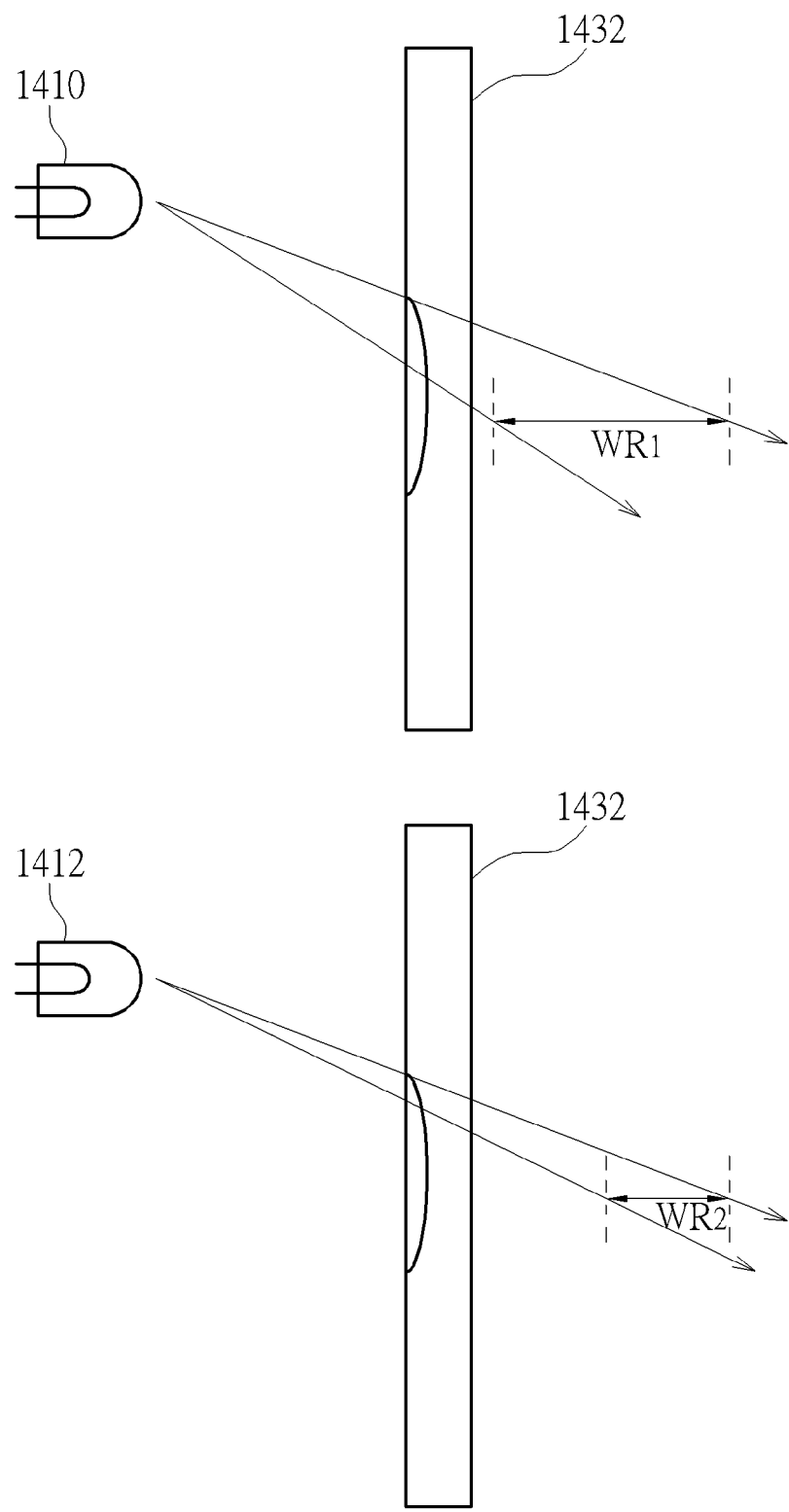
FIG. 14 is a diagram illustrating gesture sensitive regions adjusted with cone angles of light sources according to an embodiment of the present invention.
Figure 15:
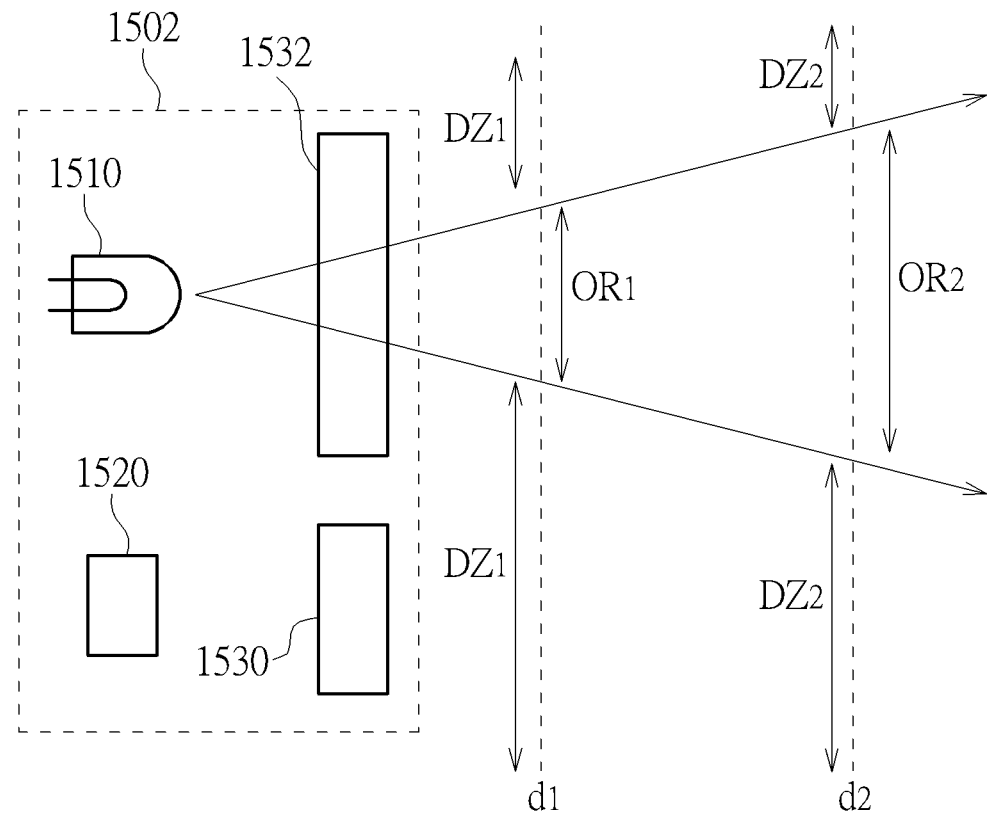
FIG. 15 is a diagram illustrating a relation between a gesture sensitive region and an operating distance of an exemplary optical sensor module according to an embodiment of the present invention.

Further, it is possible to adjust a gesture sensitive region with the aid of internal design of a light source. Please refer to FIG. 14, which is a diagram illustrating gesture sensitive regions adjusted with cone angles of light sources according to an embodiment of the present invention. As shown in FIG. 14, a cone angle of alight source 1410 is larger than a cone angle of alight source 1412. Hence, an illumination range formed by light beams which are emitted from the light source 1410 and travel through a lens 1432 is wider, such that a gesture sensitive region $WR_1$ is larger than a gesture sensitive region $WR_2$. It should be noted that, as a light emitter has a cone angle, a working range may be increased when the user performs a gesture at an adequate distance. Please refer to FIG. 15, which is a diagram illustrating a relation between a gesture sensitive region and an operating distance of an exemplary optical sensor module according to an embodiment of the present invention. The optical sensor module 1502 may be used to implement the optical sensor module 502 shown in FIG. 5, and include a light source 1510, a sensor device 1520 and a plurality of lenses 1530 and 1532. In this embodiment, when a distance between the user's hand and the display screen 504 (or the optical sensor module 1502) equals a distance $d_1$, the optical sensor module 1502 may provide a gesture sensitive region $OR_1$ (an intersection area for gesture operation at the distance $d_1$); when a distance between the user's hand and the display screen 504 (or the optical sensor module 1502) equals a distance $d_2$, the optical sensor module 1502 may provide a gesture sensitive region $OR_2$. As shown in FIG. 15, when the user performs a gesture at a position farther away from the display screen 504, a corresponding dead zone is smaller. In other words, a dead zone $DZ_2$ at the distance $d_2$ is smaller than a dead zone $DZ_1$ at the distance $d_1$.

Figure 16:
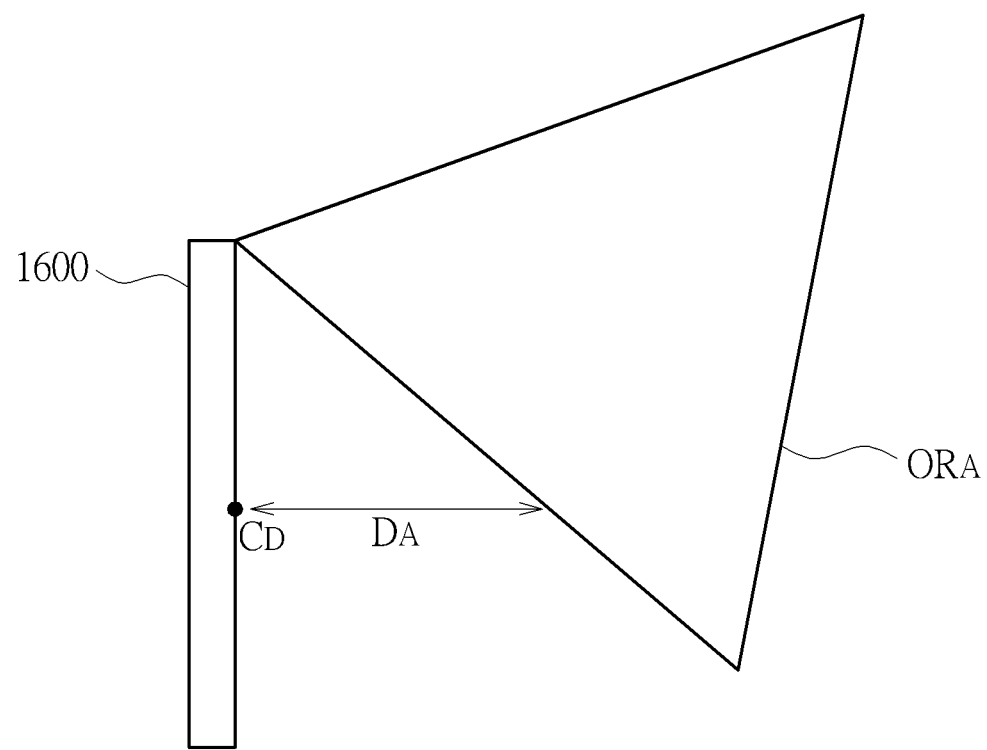
FIG. 16 is a diagram illustrating a relation between the extent of tilting and a dead zone of an exemplary optical sensor module according to an embodiment of the present invention.
Figure 16:
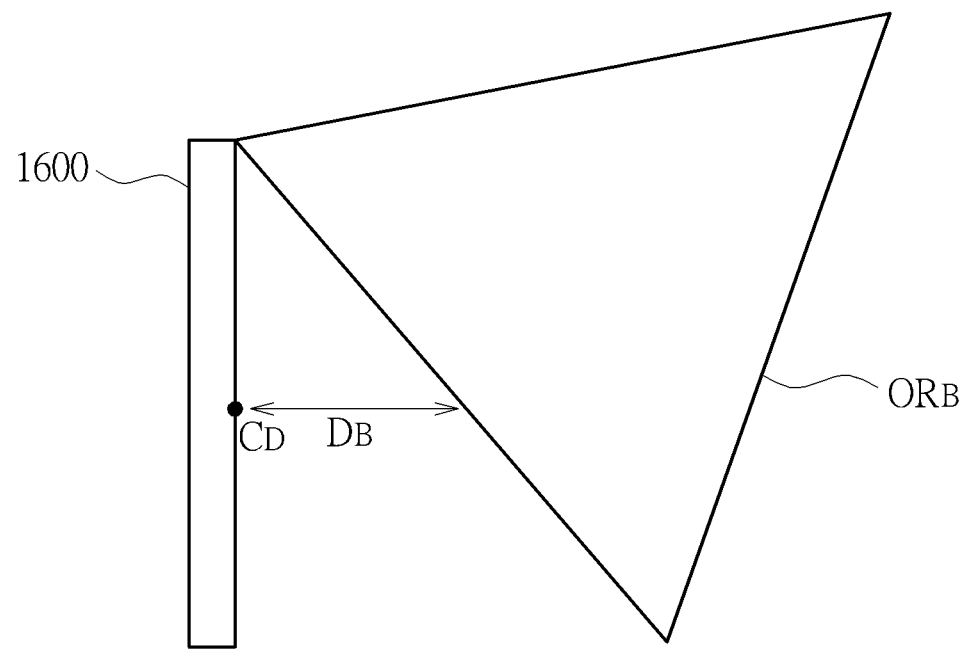

A tilt angle of an optical sensor module may affect a size of a corresponding dead zone. Please refer to FIG. 16, which is a diagram illustrating a relation between the extent of tilting and a dead zone of an exemplary optical sensor module according to an embodiment of the present invention. In the upper portion of FIG. 16, an optical sensor module (not shown in FIG. 16) of a mobile apparatus 1600 is not tilted, and corresponds to a gesture sensitive region $OR_A$. In the lower portion of FIG. 16, an optical sensor module (not shown in FIG. 16) of the mobile apparatus 1600 is tilted at a specific angle, and corresponds to a gesture sensitive region $OR_B$. As shown in FIG. 16, when the user performs a gesture above a center $C_D$ of a display area (not shown in FIG. 16) of the mobile apparatus 1600, the optical sensor module having a larger tilt angle corresponds to a smaller dead zone (a distance $D_B$ is shorter than a distance $D_A$). In other words, when the optical sensor module has a larger tilt angle, the user may perform a gesture nearer the mobile apparatus 1600. Please note that, although the above is described with reference to a whole optical sensor module which is tilted, similar results may be obtained when only sensor device(s) and/or light source(s) of the optical sensor module is tilted.

Figure 17:
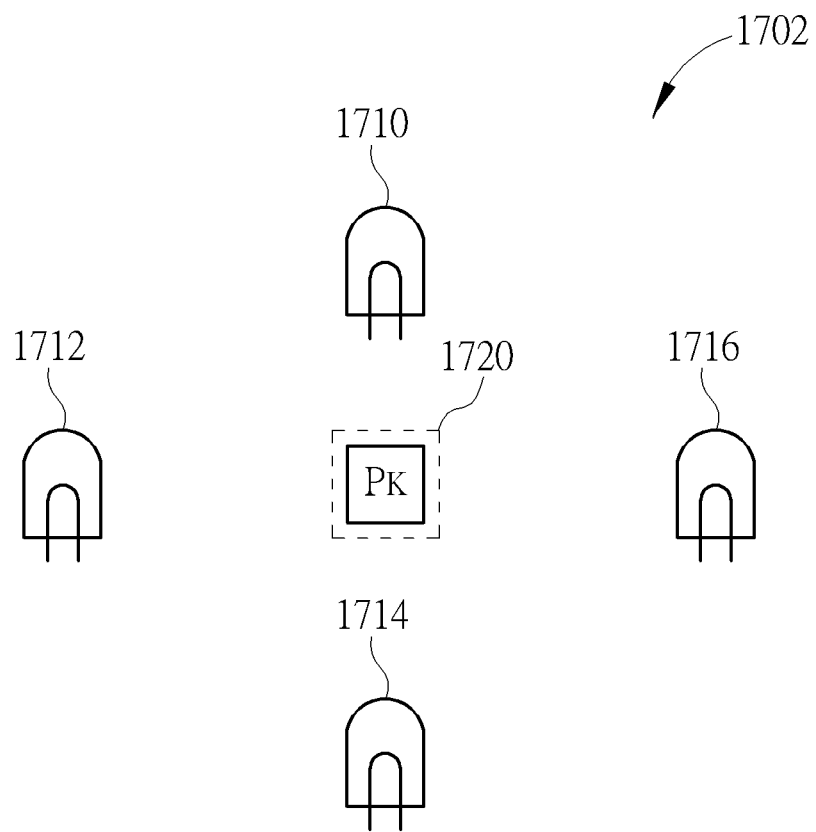
FIG. 17 is a diagram illustrating an exemplary optical sensor module according to another embodiment of the present invention.
Figure 18:
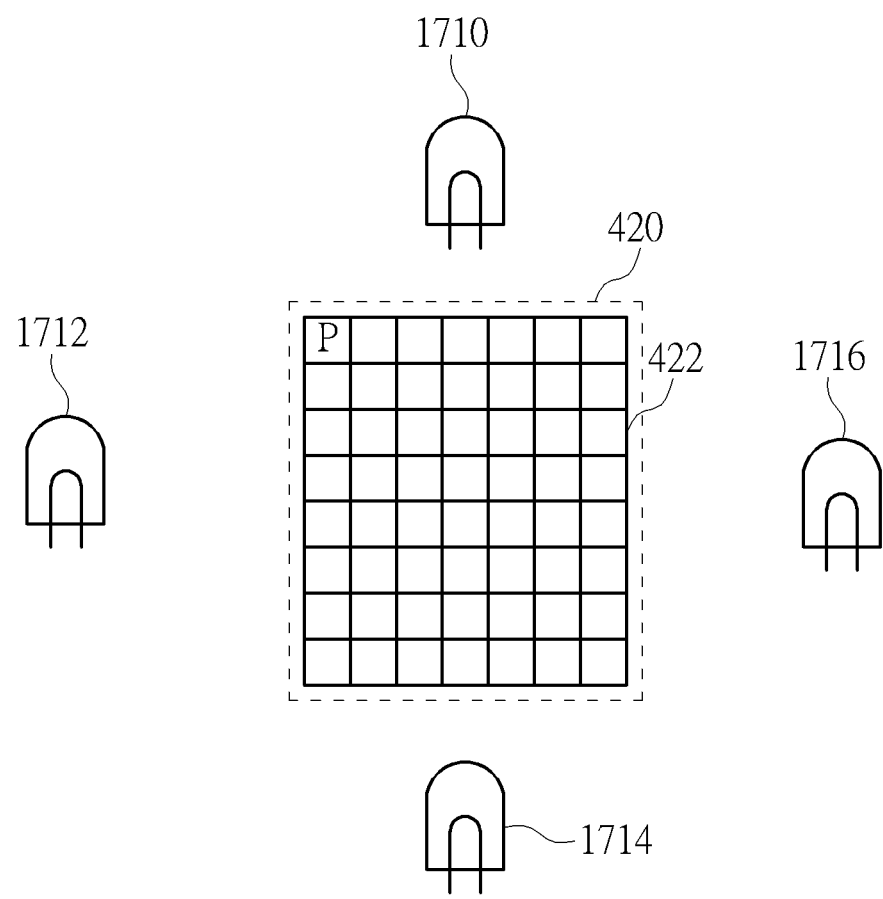
FIG. 18 is a diagram illustrating an exemplary optical sensor module according to another embodiment of the present invention.

The proposed optical sensor module may include a plurality of light sources. Please refer to FIG. 17, which is a diagram illustrating an exemplary optical sensor module according to another embodiment of the present invention. The optical sensor module 1702 may include a plurality of light sources 1710-1716 and a sensor device 1720 (implemented by a sensing pixel $P_K$ in this embodiment), wherein the light sources 1710-1716 may be activated (tuned on) alternately. As a reflecting object (e.g. the user's hand) keeps moving, reflected signals (corresponding to the light sources 1710-1716) respectively received by the sensor device 1720 may have different signal waveforms, resulting in phase differences. The sensor device 1720 may generate a sensing result accordingly, and the optical sensor module 1702 may recognize the user's gesture according to the sensing result. Additionally, in a case where the light sources 1710-1716 may emit light signal having different wave length ranges, the light sources 1710-1716 may be activated simultaneously or concurrently, and the sensor device 1720 may receive reflected signals having different wave length ranges and accordingly generate the sensing result. Although FIG. 17 illustrates four light sources, this is not meant to be a limitation of the present invention. In an alternative design, the optical sensor module 1702 may include only two light sources to detect a wave gesture (a horizontal movement or a vertical movement). In another alternative design, the optical sensor module 1702 may include at least three light sources to recognize every non-contact gesture (e.g. a wave gesture, an approaching gesture, a receding gesture or a rotation gesture) in space. Further, the sensor device 1720 may be implemented by a sensor array. For example, the sensor device 1720 may be implemented by the sensor device 420 shown in FIG. 4, which is illustrated in FIG. 18.

Moreover, the optical sensor module 502 shown in FIG. 5 may be implemented by the optical sensor module 1702. In other words, the aforementioned optical designs associated with an optical sensor module may be applied to the light sources 1710-1716 and the sensor device 1720. For example, the optical sensor module 1702 may further include a plurality of first lenses and a second lens (not shown in FIG. 17), wherein the light sources 1710-1716 are disposed in correspondence with the first lenses respectively, and each light source is disposed in correspondence with one side of a corresponding first lens. The sensor device 1720 is disposed in correspondence with one side of the second lens. For example, at least one of the light sources 1710-1716 shown in FIG. 17 and a corresponding first lens may be implemented by the light source 1010 and the lens 1032 shown in FIG. 10, respectively, and the sensor device 1720 shown in FIG. 17 and the corresponding second lens may be implemented by the sensor device 620 and the lens 630 shown in FIG. 10, respectively. Specifically, regarding each light source shown in FIG. 17, in a case where a center of a light emitting area of the light source deviates from a corresponding optical center axis in a first direction, and a center of a light sensitive area of the sensor device 1720 deviates from a corresponding optical center axis in a second direction, an angle between the first direction and the second direction may be smaller than 90 degrees. It should be noted that a plurality of first directions respectively corresponding to the light sources 1710-1716 may be different. As a person skilled in the art should understand details of optical designs of the optical sensor module 1720 shown in 17 after reading the above paragraphs directed to FIGS. 5-16, further description is omitted here for brevity.

To sum up, the proposed optical sensor module may be employed in various electronic products (e.g. a portable apparatus such as a mobile phone or a tablet computer), and utilize optical path designs to adjust a non-contact gesture sensitive region, thus allowing intuitive and convenient control.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical sensor module, comprising:
   a plurality of first lenses, wherein each of the first lenses has a first optical center axis;
   a plurality of light sources, disposed in correspondence with the first lenses respectively, the light sources arranged for generating a plurality of light signals respectively, wherein regarding each light source, the light source is disposed in correspondence with one side of a corresponding first lens, a center of a light emitting area of the light source deviates from a corresponding first optical center axis, and a light signal generated by the light source travels through the corresponding first lens toward an object;
   a second lens, having a second optical center axis; and
   a sensor device, disposed in correspondence with one side of the second lens, wherein the sensor device comprises a light sensitive area, and a center of the light sensitive area deviates from the second optical center axis; a plurality of reflected signals are reflected from the object in response to the light signals respectively, and travel through the second lens toward the sensor device; and the sensor device is arranged for receiving the reflected signals, and accordingly generating a sensing result;
   wherein the center of the light emitting area of the light source deviates from the corresponding first optical center axis in a first direction, the center of the light sensitive area deviates from the second optical center axis in a second direction, and an angle between the first direction and the second direction is smaller than 90 degrees.

2. The optical sensor module of claim 1, wherein the sensor device is a sensor array.

3. The optical sensor module of claim 1, wherein the reflected signal received by the sensor device first falls on the second lens and then travels toward the sensor device; the second lens has a field of view; and the reflected signal received by the sensor device falls on the second lens from only a portion of the field of view.

4. The optical sensor module of claim 3, wherein the portion of the field of view ranges from 10 degrees to 45 degrees.

5. The optical sensor module of claim 1, further comprising:
   a microlens structure, disposed between the second lens and the sensor device, the microlens arranged for changing a path along which the reflected signal travels from the second lens toward the sensor device.

6. The optical sensor module of claim 1, wherein projection of a sensing region of the optical sensor module on a display area comprises a center of the display area.

* * * * *